United States Patent [19]

Sugahara

[11] 4,197,930

[45] Apr. 15, 1980

[54] AIR CLUTCH WITH CENTRIFUGAL FORCE CANCELLATION DEVICE

[75] Inventor: Eisuke Sugahara, Tokyo, Japan

[73] Assignee: Nippon Piston Ring Co., Ltd., Tokyo, Japan

[21] Appl. No.: 878,102

[22] Filed: Feb. 15, 1978

[30] Foreign Application Priority Data

Feb. 25, 1977 [JP] Japan .................................. 52-19254

[51] Int. Cl.$^2$ .................... F16D 43/28; F16D 43/284
[52] U.S. Cl. .................................. 192/88 B; 192/79; 192/89 W; 192/105 CF
[58] Field of Search ................. 192/88 B, 105 CF, 79, 192/99 B, 89 W, 103 B, 103 F, 106 F

[56] References Cited

U.S. PATENT DOCUMENTS

| 1,220,901 | 3/1917 | States | 192/105 CF |
| 2,331,180 | 10/1943 | Gasser | 192/88 B |
| 2,349,494 | 5/1944 | Fawick | 192/88 B X |
| 3,856,124 | 12/1974 | Mack et al. | 192/88 B |

Primary Examiner—Rodney H. Bonck
Attorney, Agent, or Firm—Sughrue, Rothwell, Mion, Zinn and Macpeak

[57] ABSTRACT

An air clutch has a rotatable drum positioned within a rotatable rim and an air bellows attached to the interior surface of the rim and expandable with the supply of compressed air to urge a plurality of friction blocks into contact with the exterior surface of the drum. The friction blocks are individually supported for radial movement by torque pins on the rim by means of restoring springs. An inertia device is provided for each friction block to apply an inwardly directed radial force to the friction block so as to cancel the effect of the centrifugal force acting on the friction block due to rotation of the rim.

2 Claims, 7 Drawing Figures

AIR CLUTCH WITH CENTRIFUGAL FORCE CANCELLATION DEVICE

BACKGROUND OF THE INVENTION

This invention relates to an air clutch which positively operates even with high speed rotation.

An air clutch is known in the art in which, as shown in FIG. 1, an air bellows 10 is inflated with compressed air so that a plurality of friction shoe blocks 1 abutted against the bellows 10 are caused to be brought into contact with a drum 7, thereby causing the rim 9 and drum 7 to rotate together transmitting power. With this conventional air clutch, as the number of revolutions is increased, the centrifugal force exerted on the friction shoe block 1 is increased in proportion to the square of the number of revolutions. FIG. 5 illustrates the relationships between the number of revolutions and loss of contact pressure due to centrifugal force. Therefore, it is necessary to increase the air pressure in the bellows 10 to avoid friction loss. However, there is a limiting rotational speed above which the application of the clutch of this type becomes impractical.

SUMMARY OF THE INVENTION

Accordingly, an object of this invention is to provide an air clutch which is uneffected by centrifugal forces acting on the friction shoe blocks and without increasing the air pressure for increasing clutch revolutions. This is accomplished by providing the air clutch according to this invention with an inertial mechanism in which weights are attached to lever members pivotally mounted on a torque pin so as to cancel the centrifugal force exerted on a friction shoe block.

DESCRIPTION OF THE PREFERRED EMBODIMENT

Figure 1:
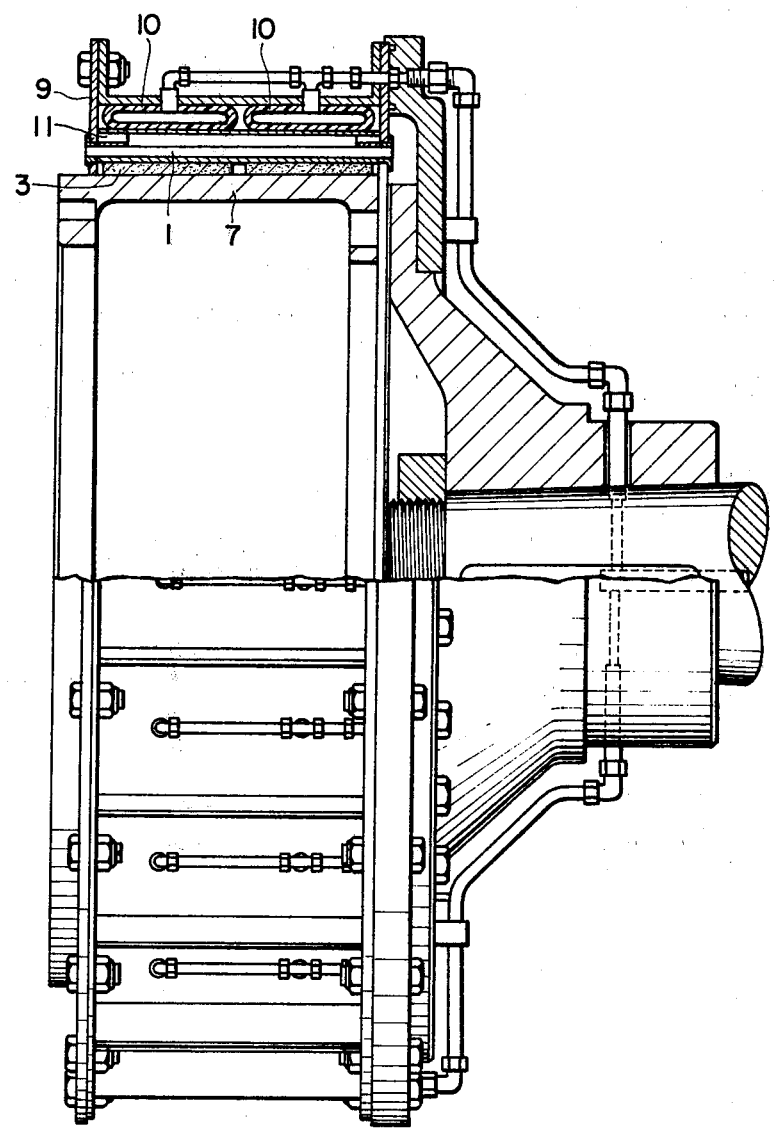
FIG. 1 is a cross-sectional diagram showing a conventional air clutch.

As shown in FIG. 1, a friction shoe block 1 is hung on a torque pin which is fixedly supported on a side plate of rim 9 through a restoring spring 11. When centrifugal force acts on the block 1, it is moved radially outwardly. The air bellows 10 is inflated with compressed air supplied from outside the clutch so as to bring the friction shoe 3 attached to block 1 into contact with drum 7 to achieve the transmission of power.

Figure 2:
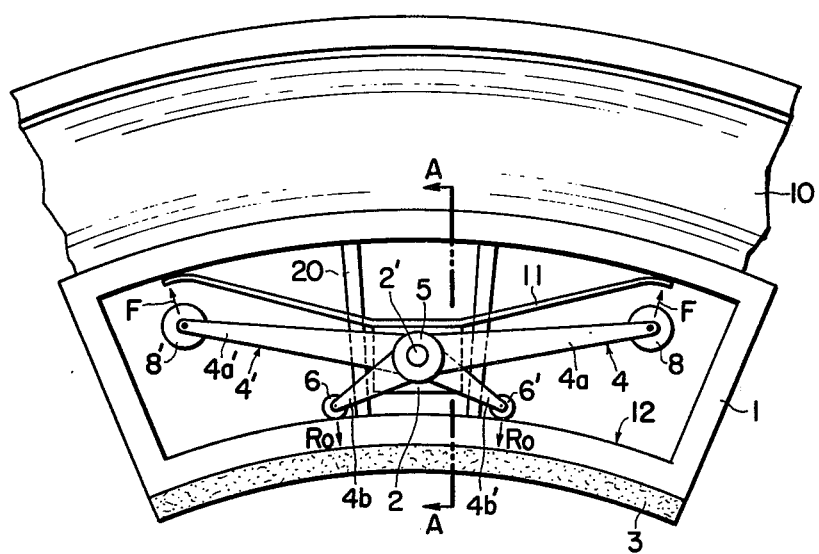
FIG. 2 is a fragmentary cross-sectional diagram showing a friction shoe block in an air clutch according to this invention.

According to the present invention, as illustrated in FIGS. 2, 3, 6 and 7 two pairs of lever members 4 are pivotally mounted on a supporting portion 2' of a torque pin 2 which supports the block 1 for radial movement by means of the restoring spring 11. Each lever member 4 comprises an arm 4a which supports an intertial weight 8 to which centrifugal force is applied, an arm 4b supporting a contact member 6, and a boss 5 connecting these arms together. These lever members 4 are symmetrically mounted on the torque pin 2 in crossed relation to one another as seen in FIG. 2. The symmetrically mounted lever members 4 and 4' are spaced apart with each other by means of a washer 21' interposed therebetween. In the drawings, like parts and components are designated by adding prime to the same reference numerals.

Figure 3:
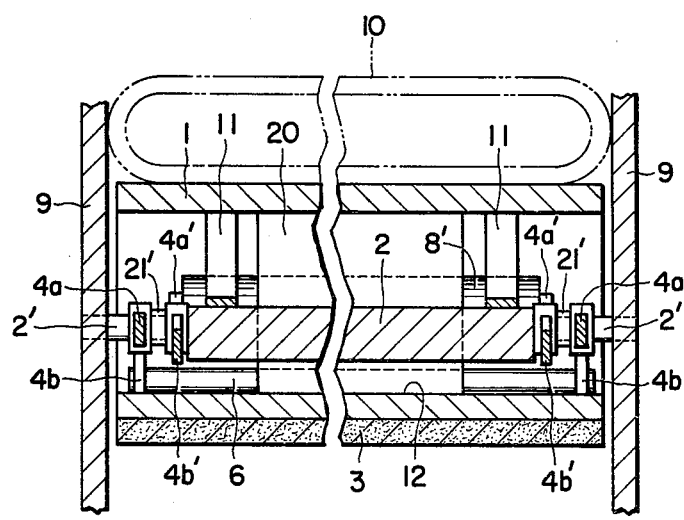
FIG. 3 is a sectional view taken along line A—A in FIG. 2.

In the embodiment shown, the centrifugal weight 8 as shown in FIG. 3 may be in the form of a round rod provided in a hollow section formed in the block 1. The round rod connects the arm 4a of the lever member positioned at one end of the torque pin 2 with the other arm 4a of the lever member positioned at the other end of the torque pin 2. The friction shoe block 1 is movable with respect to the torque pin 2 by the sliding engagement between the stationary torque pin 2 and wall members 20 which sandwich the pin. Alternatively, the weight member is formed in a heavy spherical or rectangular shape which is connected to the respective arm 4a, or the lever members 4 may be provided in a space especially formed around the central portion of the torque pin 2 instead of at both ends thereof.

The contact member 6 provided at the end of the arm 4b abuts the floor 12 of the interior surface of the friction shoe block 1 and presses the friction shoe block 1 radially inwardly when centrifugal force acts on the weight 8. Due to vibration, there is the possibility of damage to the floor 12 by contact member 6. In order to eliminate this drawback, it is preferable that the contact member 6 is covered with elastic material.

FIGS. 2 and 3 show that the contact member 6, similar to the centrifugal weight 8, has one end connected to the arm 4b of the lever member positioned at one end of the pin 2 and the other end connected to the other arm 4b of the lever member positioned at the other end of the pin 2. Since the centrifugal force applied to the contact member 6 is required to be low in comparison with the centrifugal force applied to the weight 8, the weight of the contact member 6 should be as light as possible. Accordingly, the contact member 6 may be made quite small consistant with strength requirements.

In operation, the air bellows 10 are inflated to depress the friction shoe block 1 radially inwardly so as to bring the shoe into contact with the drum. If the rotation speed is low, then the centrifugal force exerted on the block 1 is small; however, as the rotation speed is increased, the centrifugal force exerted on the block 1 is increased in proportion to the square of the number of revolutions. By means of this invention, the centrifugal force is cancelled, and therfore the block 1 is uneffected by the centrifugal force as will become more apparent from the following description.

The centrifugal force is applied to the inertial weight 8. However, as the lever members are pivotally mounted on the torque pin 2 was described before, a reaction force is generated in the contact member 6 because the centrifugal force is transmitted from the arm 4a to the arm 4b.

Figure 4:
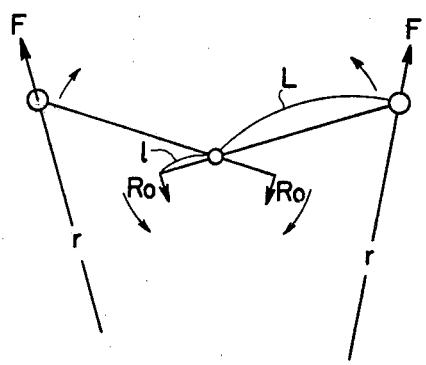
FIG. 4 is an explanatory vector diagram indicating the action of the forces of centrifugal weights.
Figure 5:
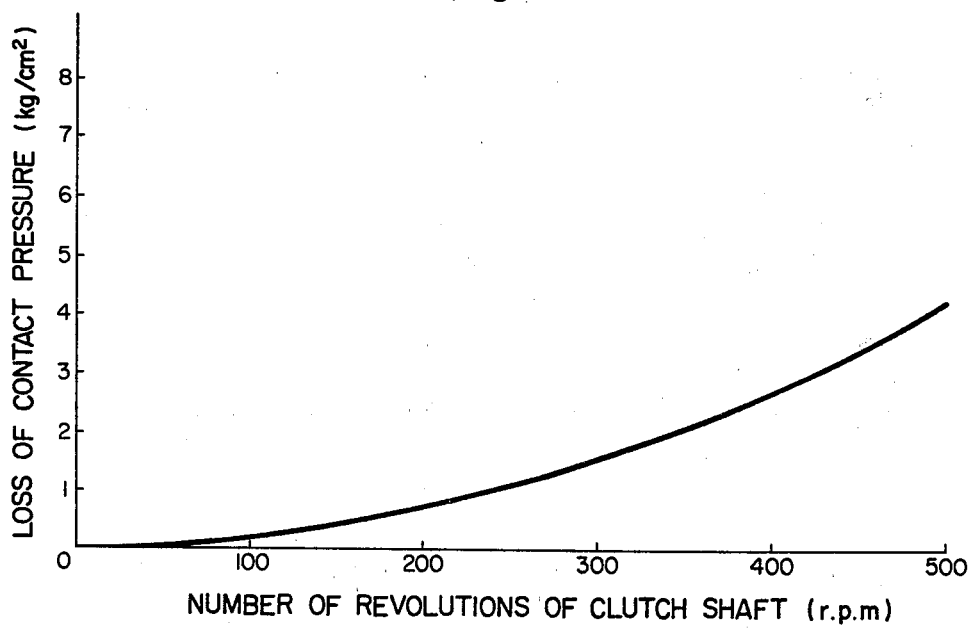
FIG. 5 is a graphical representation showing one example of the relationships between clutch shaft rpm and loss of contact pressure.
Figure 6:
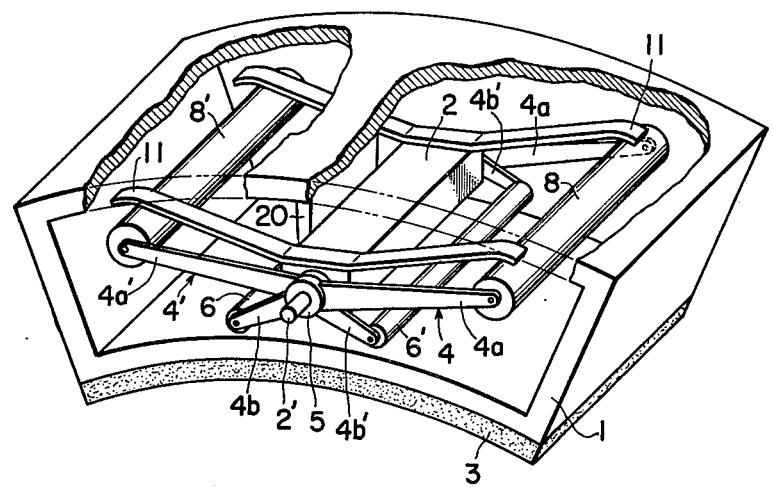
FIG. 6 is a schematic view partly cut away according to the present invention.
Figure 7:
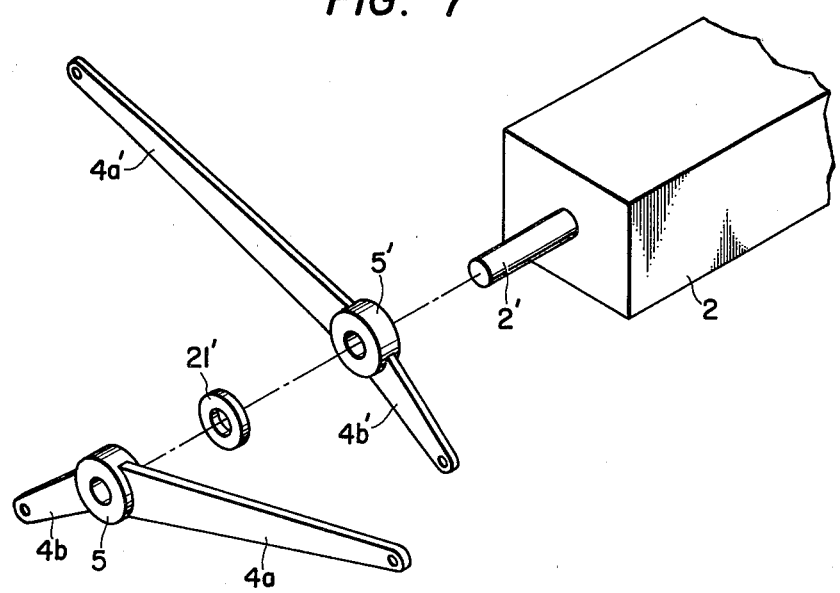
FIG. 7 shows an assembly of lever members, a washer and a torque pin.

If it is assumed that, as shown in FIG. 4, a centrifugal force F is exerted on the inertial weight 8, the contact member 6 acts on the floor 12 with a force $R_0$, the arms $4a$ and $4b$ have lengths L, and l, respectively, then the balance between the forces can be expressed as follows:

$$FL=R_0 l;$$

therefore, $$R_0 = F \times L/l \qquad (1)$$

That is, a force $R_0 = F \times L/l$ is exerted on the floor 12. This force $R_0$ in cooperation with the acting force $R_0$ of the other lever member provided symmetrically with respect to the torque pin 2 operates to depress the block 1. The reason why one pair of lever members 4 are provided is that the block 1 is depressed toward the axis without rotation. Therefore, the sum of the forces depressing the block 1 is $2R_0$ which can be expressed by the following equation (1') based on equation (1) described above:

$$2R_0 = 2F \times L/l \qquad (1')$$

The centrifugal force F of the inertial weight 8 is:

$$F = W/g \cdot r \cdot \omega^2 \qquad (2)$$

where W is the weight, r is the distance from the clutch axis to the weight, and $\omega$ is the angular rotation speed, $\omega = 2\pi N$ where N is the number of revolutions. If the value W of equation (2) is substituted into equation (1) and $2R_0$ is replaced by R, then $$R = \frac{2W}{g} \cdot r \cdot \omega^2 \cdot \frac{L}{l} = \frac{2WLr}{gl} \cdot \omega^2 = \frac{2WLr}{gl} \cdot (2\pi N)^2 = \qquad (3)$$
$$\frac{8\pi^2 WLr}{gl} N^2 = KN^2 \; (\because K = \frac{8\pi^2 WLr}{gl})$$

Thus, the force R is increased in proportion to the square of the number of revolutions and acts in the opposite direction to that of the centrifugal force F, as a result of which the centrifugal force F is cancelled.

In order to cancel the centrifugal force $F_0$ of block 1, it is necessary that $R=F_0$. Thus, if the weight of the block 1 is $W_0$ and the distance from the clutch axis to the center of gravity of the block 1 is $r_0$:

$$F_0 = \frac{W_0}{g} \cdot r_0 (2\pi N)^2 = \frac{4\pi^2 r_0}{g} W_0 \cdot N^2 = \qquad (4)$$
$$K_0 \cdot N^2 \; (\because K_0 = \frac{4\pi^2 r_0 W_0}{R})$$

Therefore, for $R=F_0$, $KN^2 = K_0 N^2$, and:

$$K = K_0 \qquad (5)$$

If the values of the constants are substituted into equation (5), then:

$$\frac{8\pi^2 WLr}{gl} = \frac{4\pi^2 r_0 W_0}{g} \; \therefore W = \frac{W_0}{2} \cdot \frac{r_0}{r} \cdot \frac{l}{L} \qquad (6).$$

If the various values are determined according to equation (6), it is possible to provide an air clutch free of the effects of centrifugal force. In the above calculation, the moment of inertia due to the configuration of the weights and the weights of small components are omitted for a rough estimate. Therefore, if the weight $W_0$ of the block 1, the distance $r_0$ to the center of gravity from the clutch axis, the distance r to the weight 8 from the clutch axis, and the ratio of l/L of lengths of arms $4a$ and $4b$ are determined, the weight W of the weight 8 to be installed can be obtained. In contrast, it is possible that first the weight W of the weight 8 is specified, and then the arm ratio l/L is determined by changing or adjusting the lengths of the arms. Although it is ideal to determine the various data according to equation (6), it is possible to minimize the size of the weight 8 or the like within the limitation of air pressure supplied.

As is apparent from the above description, the air clutch according to this invention is so designed that it is free of the effects of centrifugal force due to the application of a force in a direction to cancel the centrifugal force. Therefore, the range of the number of revolutions of use thereof can be greatly increased. Furthermore, in the application of this invention, it is not necessary to greatly modify the conventional air clutch. In addition, manufacture and installation of the air clutch according to the invention can be readily achieved.

What is claimed is:

1. In an air clutch of the type having a rotatable drum positioned within a rotatable rim; an air bellows attached to the interior surface of said rim and expandable with the supply of compressed air to urge a plurality of friction blocks into contact with the exterior surface of said drums so as to cause said rim and drum to rotate as a unitary structure, each of said friction blocks being individually supported for radial movement by respective torque pins attached to said rim by means of restoring springs, and each of said friction blocks having a floor comprising an inner radially outwardly facing surface of said friction block; and a plurality of inertia means mounted on each of said torque pins for applying inwardly directed radial force to said friction blocks, the inertia means comprising:
   (a) first and second levers pivotably mounted at one end of said torque pin in crossed relation and symmetrical with respect to a radius of said rim;
   (b) third and fourth levers pivotably mounted at the other end of said torque pin in crossed relation and symmetrical with respect to a radius of said rim, each of said first through fourth levers having radially outer and radially inner ends;
   (c) a first inertia weight connected between the radial outer ends of said first and third levers;
   (d) a second inertia weight connected between the radial outer ends of said second and fourth levers;
   (e) a first contact member connected between the radial inner ends of said first and third levers; and
   (f) a second contact member connected between the radial inner ends of said second and fourth levers, said contact members being in abutment with the floor of said friction block whereby centrifugal force exerted on each of said inertia weights will result in the application of an inwardly directed radial force through said contact members to said friction block, which inwardly directed radial force is substantially equal and opposite to the centrifugal forces acting on said friction block due to the rotation of said rim.

2. The inertia means as defined in claim 1, wherein each of said contact members is covered with elastic material.

* * * * *